(12) United States Patent
Stevenson et al.

(10) Patent No.: US 11,449,929 B2
(45) Date of Patent: Sep. 20, 2022

(54) MULTI-TENANT BROKER-BRANDED ONLINE AUCTION SYSTEM

(71) Applicant: PFX Inc., Glendale, CA (US)

(72) Inventors: David R. Stevenson, Pasadena, CA (US); Kielo K. Stevenson, Pasadena, CA (US); Harri J. Salomaa, Mountain View, CA (US)

(73) Assignee: PFX Inc., Glendale, CA (US)

( * ) Notice: Subject to any disclaimer, the term of this patent is extended or adjusted under 35 U.S.C. 154(b) by 11 days.

(21) Appl. No.: 16/869,542

(22) Filed: May 7, 2020

(65) Prior Publication Data

US 2020/0357047 A1    Nov. 12, 2020

Related U.S. Application Data

(60) Provisional application No. 62/844,480, filed on May 7, 2019.

(51) Int. Cl.
*G06Q 30/00* (2012.01)
*G06Q 30/08* (2012.01)
*G06Q 30/02* (2012.01)
*G06Q 50/16* (2012.01)

(52) U.S. Cl.
CPC ......... *G06Q 30/08* (2013.01); *G06Q 30/0275* (2013.01); *G06Q 50/16* (2013.01)

(58) Field of Classification Search
None
See application file for complete search history.

(56) References Cited

U.S. PATENT DOCUMENTS

| | | | |
|---|---|---|---|
| 9,619,837 B2 | 4/2017 | Gladis et al. | |
| 9,697,565 B2 | 7/2017 | Friedman et al. | |
| 9,697,566 B2 | 7/2017 | Friedman et al. | |
| 2002/0111892 A1* | 8/2002 | Sharp | G06Q 40/04 705/37 |
| 2002/0123959 A1* | 9/2002 | Mozley | G06Q 40/04 705/37 |
| 2009/0138381 A1* | 5/2009 | Bloomfield | G06Q 30/0601 705/26.1 |
| 2011/0087654 A1* | 4/2011 | Olson | G06Q 30/02 707/723 |
| 2013/0054513 A1 | 2/2013 | Jones | |
| 2019/0080394 A1* | 3/2019 | Wang | G06Q 30/08 |

OTHER PUBLICATIONS

"International Search Report and Written Opinion" dated Jul. 10, 2020, International Patent Application No. PCT/US2020/031964 with International Filing Date of May 7, 2020. (13 pages).

* cited by examiner

*Primary Examiner* — Mila Airapetian
(74) *Attorney, Agent, or Firm* — Innovation Counsel LLP

(57) ABSTRACT

A method and system of executing an online auction is presented. The system includes broker/agent-designed auction interfaces that have property listings, and displays select ones of the property listings from multiple brokers on a multi-tenant auction list user interface. Each of the property listings on the auction list user interface includes a link which, upon activation, launches the broker-designed auction interface where bids may be submitted.

17 Claims, 14 Drawing Sheets

CREATE BROKERAGE ACCOUNT
Let's get started

1. Account Information
2. Confirm Account
3. Company Details
4. Wait For Approval...

Real Estate Auction Platform

STEP 1/3

Account Information

Email * - this will be your login name jdoe@abc.com

Password*
••••••••••

Confirm Password*
••••••••

☑ I agree to the Terms of Service and the Privacy Policy of Real Estate Auction Platform.

Personal Information

First Name*
John

Last Name*
Doe

Professional Title (Optional)
CTO

Phone Number*
(123)456-7890

Already have an Account?
Login with your Account

Next

FIG. 4B

Real Estate Auction Platform

STEP 1/3

Confirm Account

Thank you!
A verification token will be sent to your email to confirm your new account!
Please check your email and enter your Token below.

Enter your Token to verify your account*

620478|

[ Previous ]   [ Next ]

CREATE BROKERAGE ACCOUNT
Let's get started
① Account Information
② Confirm Account
③ Company Details
④ Wait For Approval...

FIG. 4C

CREATE BROKERAGE ACCOUNT
Let's get started

① Account Information
② Confirm Account
③ Company Details
④ Wait For Approval...

Real Estate Auction Platform

STEP 2/3
Company Details
Company Name*

Choose Website URL* - allows only characters a-z, 0-9 and dash

Your own platform website address will be https://..
Company Email*

Company Number*

Agent BRE Number*

Company BRE Number*

Previous    Next

| | | | | | |
|---|---|---|---|---|---|
| AUCTIONS | | | | | |
| Buyer | | | | | |
| Broker | Property | Registration | Bids | Auction Period → | Status |
| — | MINIMUM BID AUCTION<br>555 Castro Street<br>Harri Salomaa | Approved ↑<br>Last Updated Apr 30 2019 | STARTING PRICE<br>$1,100,000 | START<br>May 28 2019 1:00PM PDT | 27D 23H 49M 26S<br>● Open |
| — | MINIMUM BID AUCTION<br>728 Lola Ln<br>Harri Salomaa | Approved ↑<br>Last Updated Apr 30 2019 | STARTING PRICE<br>$800,000 | START<br>May 28 2019 12:00PM PDT | 27D 22H 49M 39S<br>● Open |
| Watchlist | | | | | |
| Broker | Property | Bidders | Bids | Auction Period → | Status |
| — | MINIMUM BID AUCTION<br>728 Lola Ln<br>Harri Salomaa | 1 | STARTING PRICE<br>$800,000 | START<br>May 28 2019 12:00PM PDT | 27D 22H 49M 39S<br>● Open |
| — | MINIMUM BID AUCTION<br>555 Castro Street<br>Harri Salomaa | 1 | STARTING PRICE<br>$1,100,000 | START<br>May 28 2019 1:00PM PDT | 27D 23H 49M 39S<br>● Open |

FIG. 8B

MULTI-TENANT BROKER-BRANDED ONLINE AUCTION SYSTEM

CROSS-REFERENCE TO RELATED APPLICATION

This application claims the benefit of U.S. Provisional Application No. 62/844,480 filed on May 7, 2019, which is incorporated by reference herein.

BACKGROUND

The inventive concept disclosed herein relates to a method and apparatus generally for providing an online auction platform, and more specifically for providing an online auction platform for real estate.

Online auction sites provide a convenient and private way for buyers of various personal and real properties to find and buy what they want. Generally, online auction sites provide a list of auction items that went through some kind of validation process, with images, descriptions, and bidding instructions. The sites are run and managed by the entity that is running the auction, and thus has the logo and look-and-feel of the entity that is running the auction.

Online auction, especially, offers many advantages to real estate transactions, which are fraught with inefficiencies and pain points for all parties involved. For example, listing agents expend a tremendous amount of time and energy when they have to coordinate multiple offers and respond with multiple counter offers. Even after a buyer is selected, the terms may get renegotiated during escrow and the property may come back on the market. This means the whole process is repeated until a sale is finally consummated. An online auction site addresses these inefficiencies by allowing the listing agents to effect the sale without having to coordinate multiple counter offers and without having to place the property back on the market due to renegotiation during the escrow period.

Online real estate auctions are also helpful for buyers and buyer's agents, as all buyers get equal opportunity to view and bid for properties. Sellers benefit as well, not just from a broader range of exposure to more buyers but also because buyers are pre-qualified prior to the auction and bidding, reducing unexpected hurdles downstream. Furthermore, research shows that auctions achieve higher selling prices than the traditional sales process.

However, online real estate auctions that function as marketplaces are not without problems. For example, although listing agents have to do a lot of work to prepare a property for sale, the auction system leaves the listing agents and selling agents with little recognition. Buyers browse through a list of properties on auction sites, paying little attention to who the listing agent is for each property. The auction site itself gets the marketing and the recognition, but the listing agents and their respective brokerage companies are marginalized at best. This reduces the incentive for the listing agents to put their assets up on auction sites, in spite of the advantages mentioned above. A method and apparatus for an efficient way to affect real estate transactions without sacrificing the amount of control listing agents have is desired.

SUMMARY

In one aspect, the inventive concept pertains to a multi-tenant online auction system divided into three tiers. The first tier manages user interfaces, the second tier handles business logic and control, and the third tier includes secure databases. Each tier may be implemented as microservices and hosted in its own encapsulated container running on top of elastic computing cloud platform.

In another aspect, the inventive concept pertains to computer-implemented method of executing an online auction. The method entails receiving a first property listing from a first agent, receiving a second property listing from a second agent, and presenting, in an auction list user interface, the first property listing and the second property listing, the first property listing including a link that, upon activation, launches a first broker auction interface controlled by the first agent hosting an auction that includes the first property listing. The first agent is allowed to run an auction by interfacing with bidders on the first broker auction interface. In some cases, the auction list user interface is updated to reflect bids received via the first broker auction interface.

In yet another aspect, the inventive concept pertains to an online auction platform showing properties on auction, the properties including properties that are listed by a first agent and properties that are listed by a second agent, wherein a selection of one of the properties that are listed by the first agent launches a first auction user interface for an auction hosted by the first agent.

DESCRIPTION OF THE DRAWINGS

FIG. 4B, FIG. 4C, FIG. 4D, and FIG. 4E depict example screens that may be generated during the sign-in process of FIG. 4A, in accordance with an embodiment of the inventive concept.

FIG. 8A and FIG. 8B depict an example of an Activity Dashboard in accordance with one embodiment of the inventive concept.

DETAILED DESCRIPTION

A method and apparatus for conducting an online auction without reducing the reward for the listing party is presented. While the description is provided in the context of an online real-estate auction, this is not a limitation of the inventive concept and the concept disclosed herein may be applied to online auction of various other items, e.g. artwork where the artist wants more control over the sale of his/her work.

The platform disclosed herein, when applied to real estate auctions, allows listing agents to maintain control over the presentation and branding of their assets. A brokerage company creates its own customized Business Account on the auction platform server. The auction platform is a fully-functional software (SaaS) platform that can be deployed across multiple geographic regions and organizations. The auction platform allows multiple tenants (e.g., Agent A, Agent B, etc.) and multiple tiers. The broker-branded online auction section of Broker A in the auction platform is linked to Broker A's own application (e.g., a website) and can act as an extension of the broker's application by allowing a user (e.g. potential buyer) to easily switch back and forth between the Broker application and the auction platform.

As used herein, a "user" refers to auction participants and potential buyers of assets that are being auctioned, as well as agents and sellers. A "broker" refers to an entity that puts assets up for auction. An "agent" may be a broker. These references are used to avoid confusion, with the understanding that the inventive concept is not limited to real estate transactions that require a "broker." The "broker" can be any entity that sets up an account to upload assets for auction.

"Multitenancy," as used herein, refers to a software architecture in which a single instance of software runs on a server and serves multiple tenants. A "tenant" is a group of users who share a common access with specific privileges to the software instance. A "multitier" architecture (sometimes referred to as "n-tier architecture) is a client-server architecture in which presentation (Zone 1), application processing (Zone 2), and data management functions (Zone 3) are physically separated. The most widespread use of multitier architecture is a three-tier architecture. N-tier application architecture provides a model by which developers can create flexible and reusable applications.

Figure 1A:
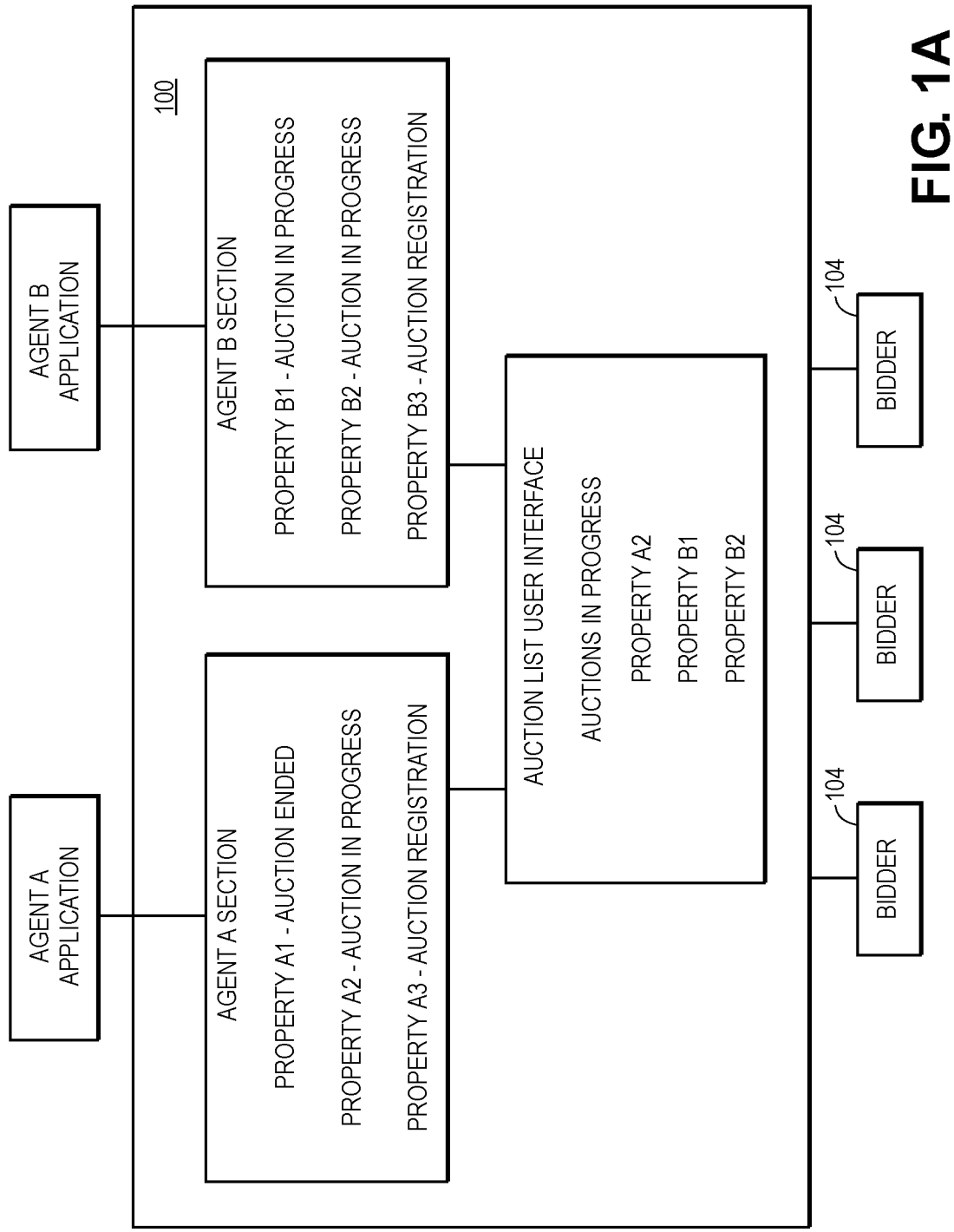
FIG. 1A schematically depicts a system for providing real-time online auction in accordance with an embodiment of the inventive concept.
Figure 8A:
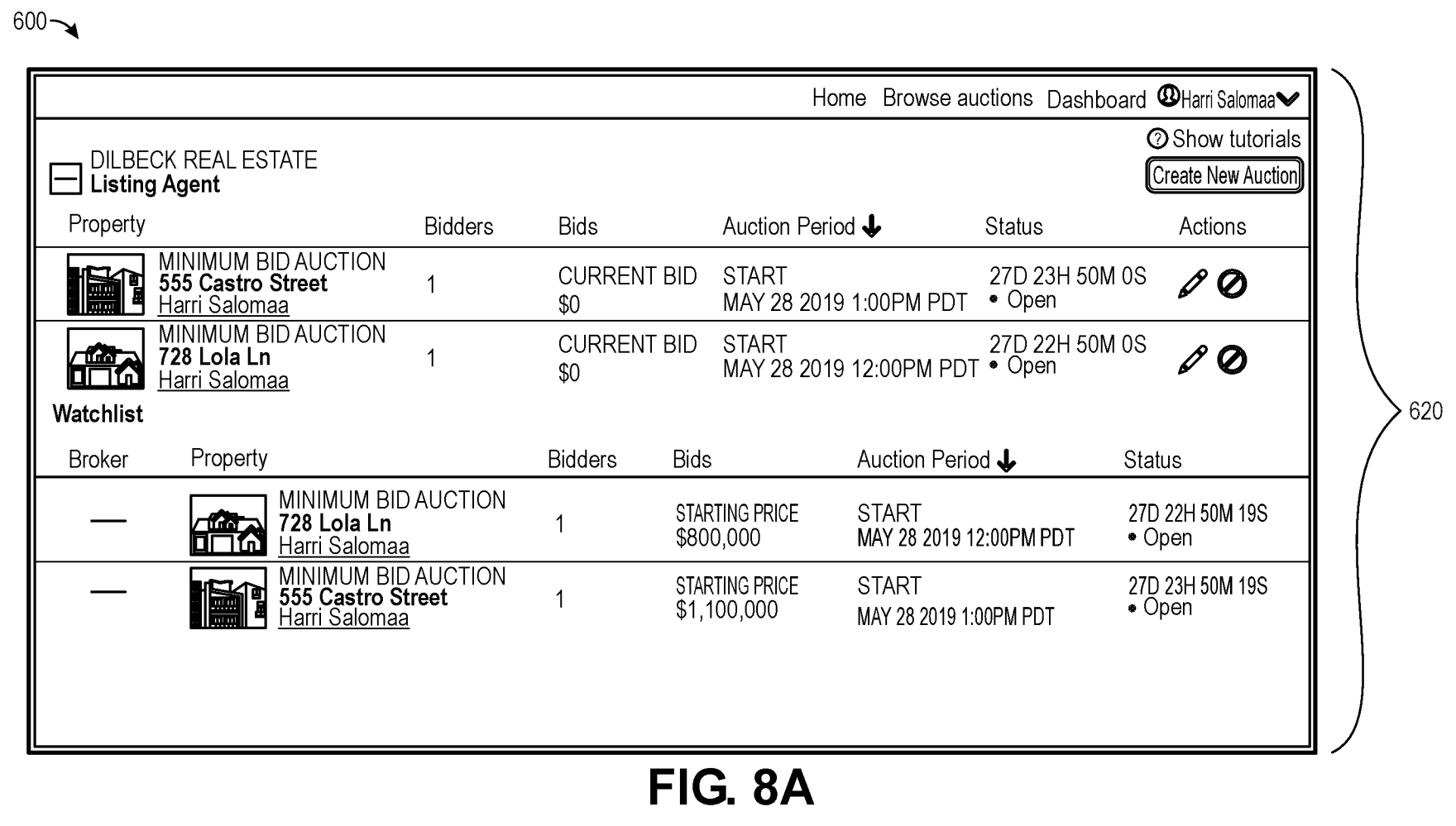

FIG. 1A schematically depicts a system for providing real-time online auction in accordance with an embodiment of the inventive concept. As shown, the system includes a broker-branded auction platform 100 that shows all the items on auction in an auction list user interface. As will be explained below in more detail, the broker-branded auction platform 100 includes the auction list user interface and displays auction details from multiple tenants. A user who is approved in a role (e.g., listing agent, seller, buyer) may access a dashboard interface, examples of which are shown in FIG. 8A (for the role of Listing Agent) and FIG. 8B (for the role of a Buyer). The dashboard interface, which varies according to the role of the user, shows certain summary information, with links that may be activated to expand into more detailed information. Using the dashboard interface, an agent can view auctions that he created and the auctions that he is participating in. The auction list user interface combines data from different agents (e.g., Agent A and Agent B) 102.

Each agent manages all the auctions from his brokerage company. Agent A's section in the auction platform 100 shows all the properties listed by Agent A (e.g., Property A1, Property A2, Property A3) in the auction platform 100, which may be all of Agent A's listings that are involved in an auction. Some of the properties that are currently on the auction list are indicated as such, so a user (e.g., bidder 104) is alerted that that property (Property A2 in the example of FIG. 1A) is part of an ongoing auction. Agent B's section in the auction platform 100, similarly, shows all the properties being auctioned by Agent B (e.g., Property B1, Property B2) and marks the properties that are part of a current auction as such. Agent A's broker auction interface for its section in the auction platform 100 is designed by Agent A, and Agent B's broker auction interface for its section in the auction platform 100 is designed by Agent B. This way, each agent controls the branding and look-and-feel of its auction to highlight its individuality.

In one embodiment, the auction list user interface may display auction statuses for properties other than "auction in progress." For example, some properties may show that "auction ended," indicating no more bids are being accepted. Other properties may show "auction registration pending," indicating that bids may be accepted up in the near future. In another embodiment, the broker-branded auction platform 100 may only show the status "auction in progress," along with a list of properties that has other statuses. In that embodiment, a user would select one of the listed properties to reach the agent's section in the platform 100 to see statuses such as "auction ended" or "auction registration pending." A bidder who visits the broker-branded auction platform 100 may be able to filter or sort properties according to auction status.

Furthermore, as will be explained in more detail below, selecting one of Agent A's property listings in the auction platform 100 launches an application controlled by Agent A, which may show all the properties listed by Agent A including ones that are not part of an auction. Similarly, selecting one of Agent B's property listings in the auction platform 100 launches an application controlled by Agent B.

Bidders may enter the broker-branded auction platform 100 by registering at the auction list user interface, or indirectly through an agent application. The property may also be a part of a digital advertisement, for example in another application, with a link indicating that the property is part of an auction. Potential bidders who see the advertisement can click on the auction link to get redirected to the broker-branded auction platform 100. A bidder who is redirected may have to log in to access the broker-branded auction platform 100.

Figure 1B:
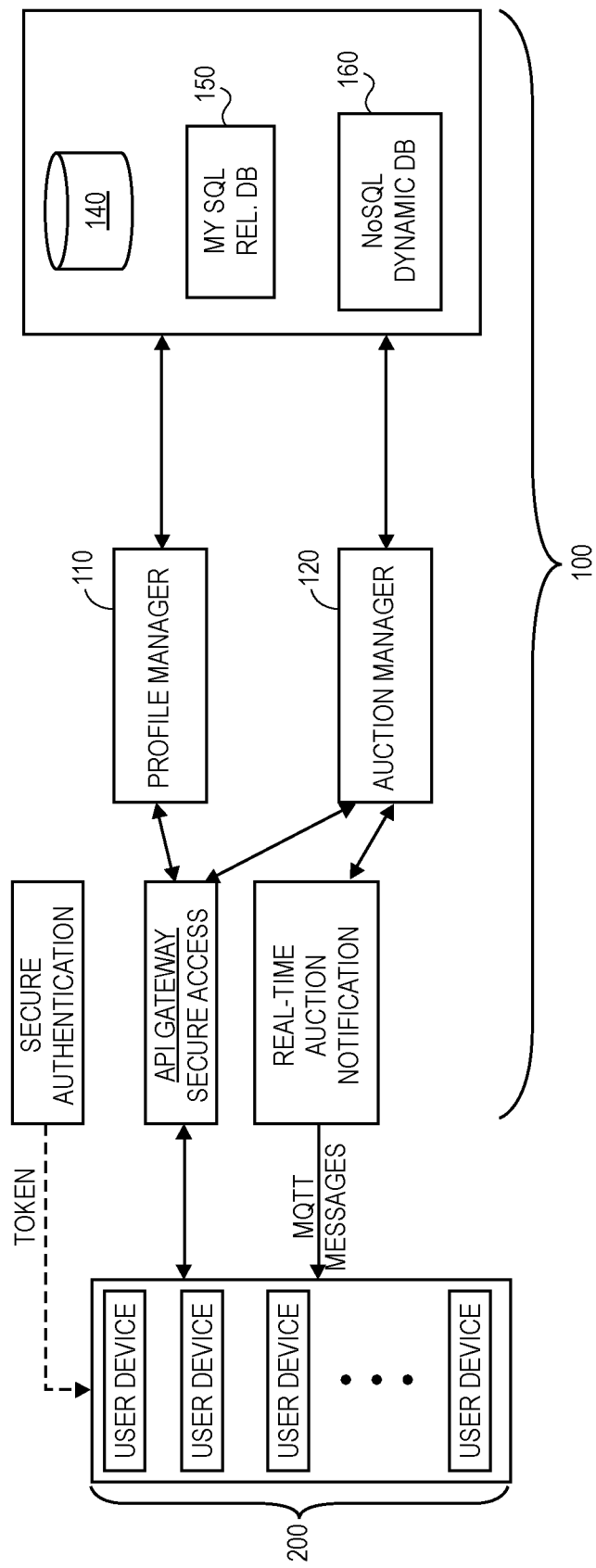
FIG. 1B depicts a system for providing real-time online auction in accordance with an embodiment of the inventive concept.

FIG. 1B depicts a system for providing real-time online auction in accordance with an embodiment of the inventive concept. As shown, the broker-branded auction platform 100 includes a profile manager 110 and an auction manager 120. The profile manager 110 provides a set of APIs to manage broker account information as well as account information of individual users such as listing agent, selling agent, transaction coordinator, seller, buyer, and system administrator. Auction manager 120 provides a set of APIs to manage online auctions, buyer candidate qualification, and system notifications related to the application of the online auction process. In the particular embodiment that is depicted, user devices 200, which may be any computing device with network communication capability such as smart phones, laptops, desktops, tablets, etc., interact with the broker-branded auction platform 100 via three interface services: 1) AWS Cognito for secure authentication and authorization, 2) AWS IoT for sending real-time online auction notifications (MQTT messages), and 3) API Gateway for secure access to the profile manager 110 and auction manager 120. In one embodiment, the auction platform 100 stores asset information (e.g., due diligence information) to a secure S3 database 140, user profile information and broker profile information to a MySQL relational database 150, and online information to NoSQL DynamoDB 160.

A user who visits the broker-branded auction platform 100 is able to use a search function to filter for properties of interest. Upon finding a property of interest, the user can click on the property to enter the listing agent's section in the platform 100. In some embodiments, the user may be presented with an option to be redirected to the listing agent's application (e.g., the agent's website) that is not part of the platform 100.

Figure 2:
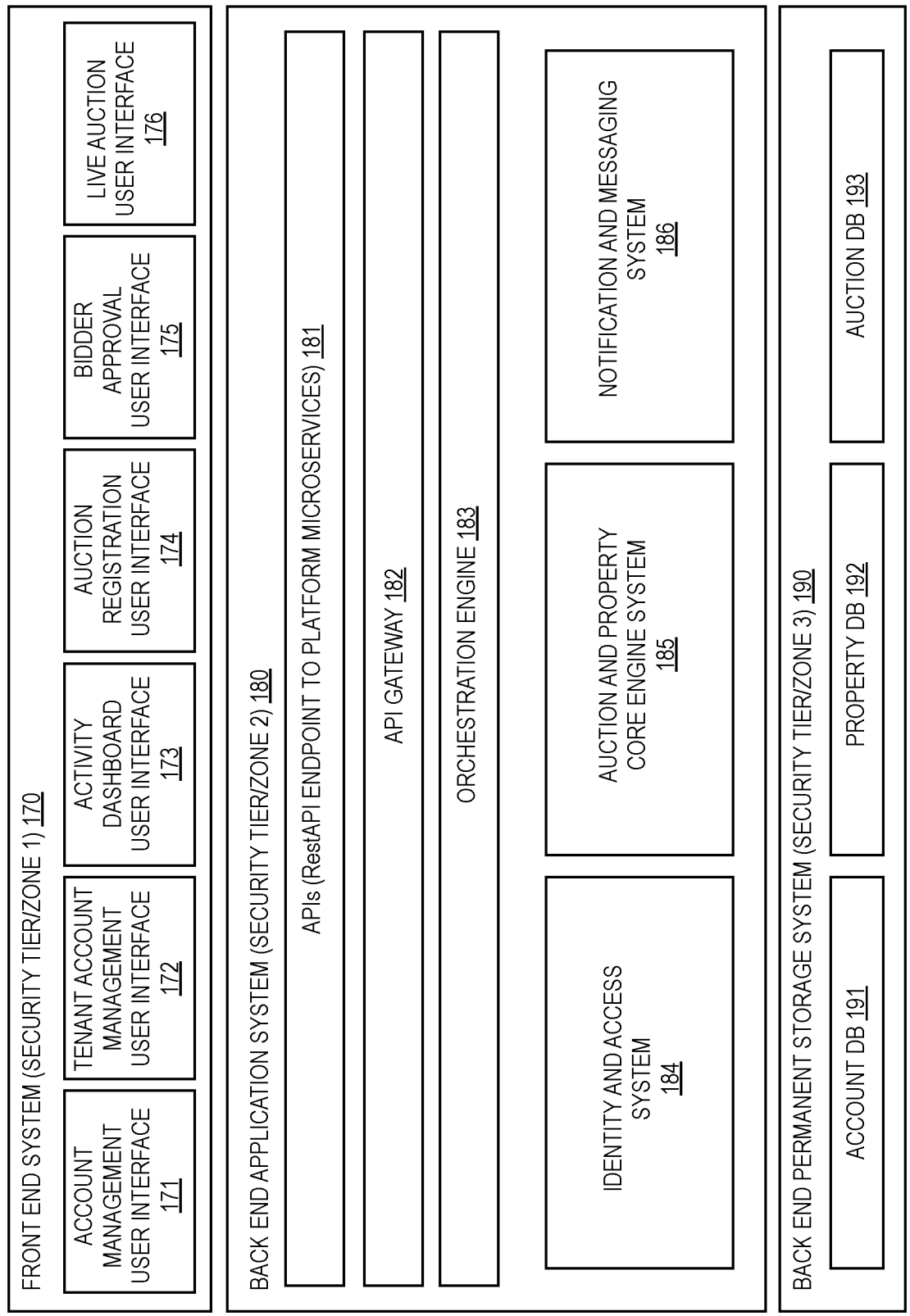
FIG. 2 depicts an online auction system implemented with microservices in a multitier architecture, in accordance with an embodiment of the inventive concept.

FIG. 2 depicts the online auction system implemented with microservices in a multitier architecture, in accordance with the inventive concept. As shown, the particular architecture has three tiers: a front-end system 170, a back-end application system 180, and a back-end permanent storage system 190. The adjacent tiers securely communicate with each other: the front-end system 170 securely communicates with the back-end application system 180, and the back-end permanent storage system 190 communicates with the back-end application system 180. In one embodiment, each tier is running on its own server not shared with other tiers. The front-end system 170 is where the user interface details reside. The back-end application system 180 deals with business logic and control, and is where application worksheets and API end points to Platform Microservices reside. The back-end permanent storage system 190 securely stores data. The tiers are implemented in a microservice system so that each piece is running in its own container. The architecture that is depicted is fully deployable and manageable.

"Microservices" are fine-grained units of execution, each one designed to perform one specific function well. Each microservice has one well-known entry point. Microservices run on top of "Service Fabric=Cloud Platform Services" that provides high availability, self-healing, replication and failover, startup, showdown, low latency, rolling upgrades, data partitioning, hyper-scalability, etc. Microservices contain operating system, platform, framework, runtime and dependencies, packaged as one unit of execution. Each microservice is an independent, autonomous process with no dependency on other microservices. Microservices communicate with each other through language and platform-agnostic application programming interfaces (APIs). These APIs are typically exposed as REST endpoints or can be invoked via lightweight messaging protocols (e.g., RabbitMQ). The APIs are loosely coupled with each other avoiding synchronous and blocking calls as much as possible.

The application logic resides primarily in the second tier (back-end application system 180). The back-end application system 180 includes APIs 181, all of which are exposed to the RestAPIs. "Rest" in RestAPI stands for Representational State Transfer. REST is an architecture style for designing networked applications. Rather than using complex mechanisms such as CORBA, RPC, or SOAP to connect between machines, simple HTTP is used to make calls between machines. The primary purpose of REST-compliant Web services is to manipulate representations of Web resources using a uniform set of stateless operations. The API Gateway 182 hosts application log sheets and access points to these services, and provides security to the whole system. Access to the various services in the system is provided through the API Gateway 182.

The back-end application system 180 also includes an orchestration engine 183 that orchestrates secure access to the system, an Identity and Access Management System 184, Auction and Property Core Engine System 185, and a Notification and Messaging System 186. The Identity and Access Management System 184 is the security and business discipline that enables the right parties to access the right resources/data at the right times and for the right reasons. It addresses the need to ensure appropriate access to resources across increasingly heterogeneous technology environments and to meet increasingly rigorous compliance requirements. The Auction and Property Core Engine System 185 tracks the status of bids on properties that are up for auction. It implements auction rules and parameters to regulate the auction from beginning to end. The Notification and Messaging System 186 manages outgoing communication to user devices 200.

The front-end system 170 hosts modules that manage user interface and auction details, such as Account Management User Interface 171, Auction Management User Interface 172, Activity Dashboard User Interface 173, Auction Registration User Interface 174, Bidder Approval User Interface 175, and live Auction User Interface 176.

Figure 4A:
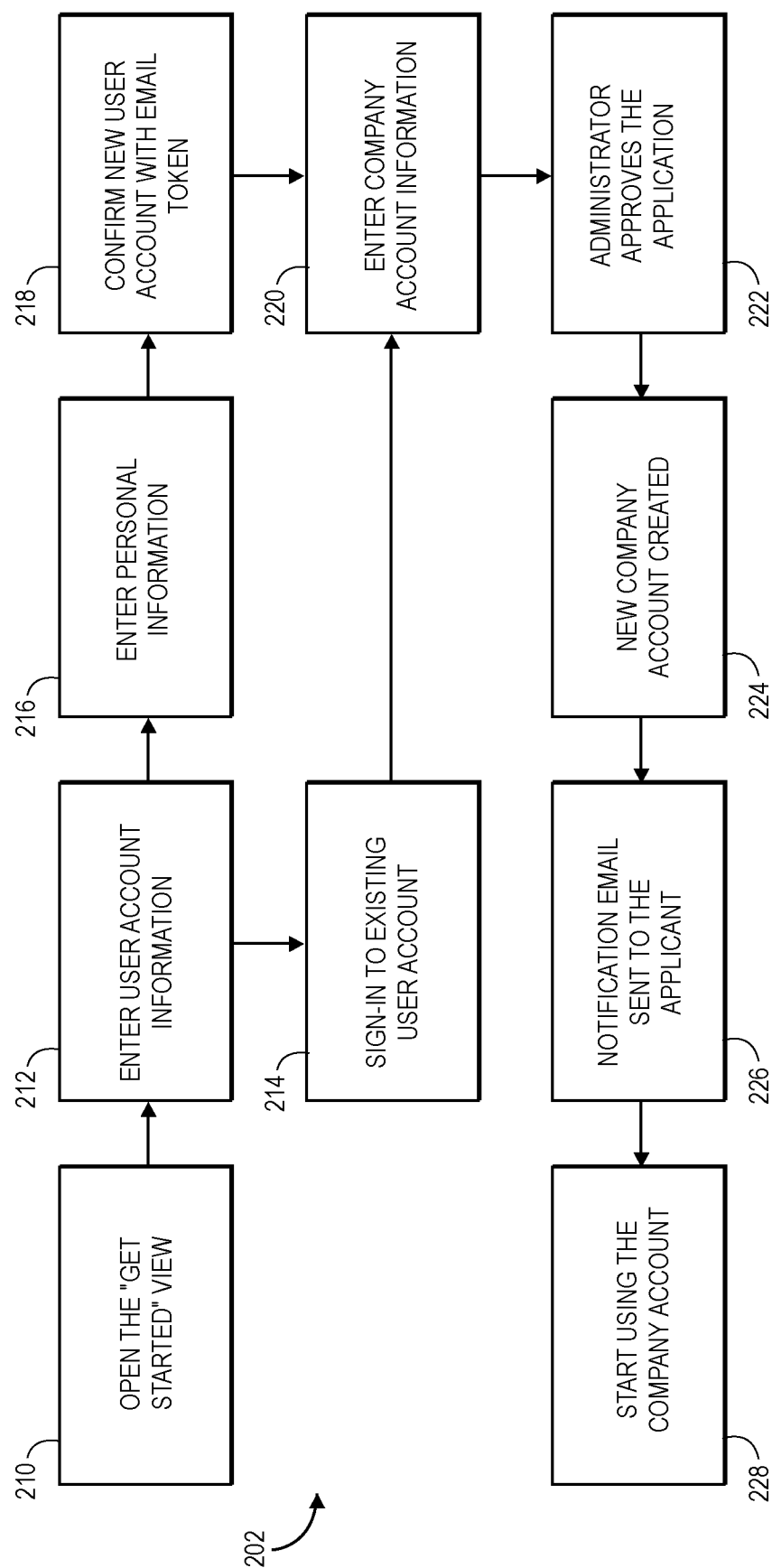
FIG. 4A depicts a customized user account sign-in process in accordance with an embodiment of the inventive concept.
Figure 4E:
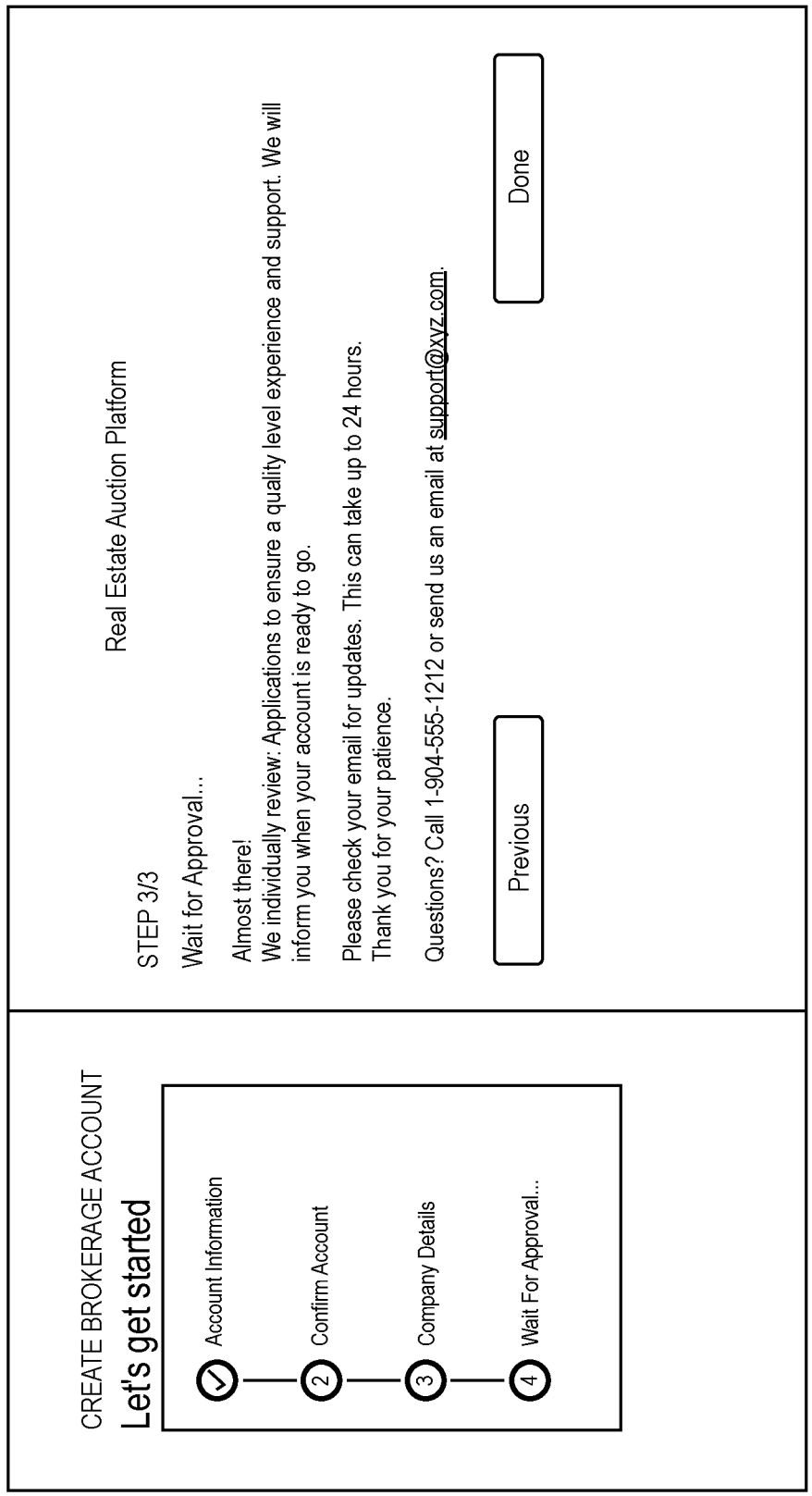

The User Account Management User Interface 171 is used by a user to set up an account, then sign in and out of his account. The user device 200 first sets up a brokerage account by receiving a token to establish secure communication via the AWS Cognito interface. FIG. 4A depicts the customized broker account sign-in process 202, in accordance with an embodiment of the inventive concept. As shown, a user at the broker account (herein referred to as the "broker") goes into the auction list user interface for the auction platform and opens the "Get Started" view (step 210). The broker enters Broker Account information (step 212, see FIG. 4B) and signs in if an account was previously set up (step 214). If no user account was previously set up, the broker enters personal information (step 216) and confirms the broker account (step 218), for example with a two-step verification or email token (see FIG. 4C). Then, the broker company account information is entered (step 220, see FIG. 4D). The user may receive a notification such as what is depicted in FIG. 4E. After the auction platform 100 reviews and approves the application (step 222), a new company account is created (step 224). A notification is generated and sent to the applicant about the creation of the new account (step 226), and the company account is ready to be used (step 228) for the agent section of the platform 100. The Auction Management User Interface is for auction/listing creation, editing, and publishing of the agent's section in the platform 100.

Figure 5:
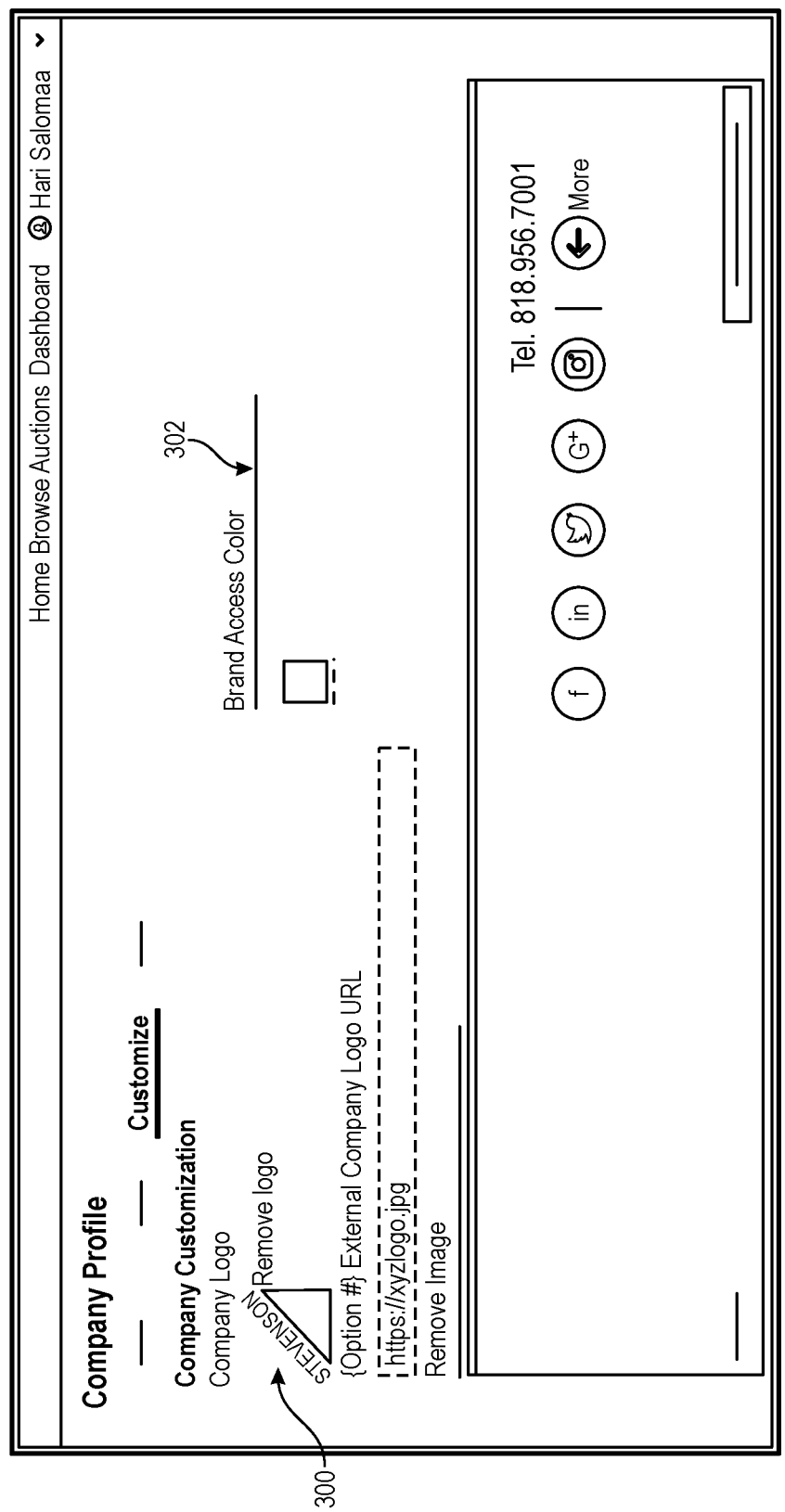
FIG. 5 depicts an example of a page that an agent might use to customize the brokerage company account after the user account is set up, in accordance with an embodiment of the inventive concept.

The Tenant Account Management user Interface 172 may be used to customize the look of the tenant (e.g., upload logos, colors, etc.) in the agent's section. Once the broker account is established, a broker can set up and manage auctions. FIG. 5 depicts an example of a page that the agent might use to customize the broker auction interface after the user account sign-in process 202 is completed, in accordance with an embodiment of the inventive concept. As shown, the agent can customize and brand its listings with various design elements of choice including company logo 300, color(s) 302, and other images (e.g., company banner), fonts, etc. Live links (e.g., links to brokerage company application) and company contact information may also be added. When an agent creates a new auction and defines the properties, the information about the properties may be manually entered and/or uploaded, or imported from various sources that are available and permitted.

The Activity Dashboard User Interface 173 allows a user to interact with a system Dashboard, which is depicted in FIG. 8A and FIG. 8B.

The Auction Registration User Interface 174 may be used by interested bidders to register to participate in an auction. The Interface 174 requests the information in an application that is required for registration, and sends the application to the agent who owns the auction upon receiving the requested information. The user may get a request for missing/additional information, then ultimately a notification of approval.

The Bidder Approval User Interface 175 is used by agents to review the application that is received via the Auction Registration User Interface 174. An agent may open the application (e.g., from the Dashboard) and request additional information or approve the application. Once a bidder is approved, he can participate in the live auction, which is set to happen at a specific time.

Figure 7:
FIG. 7 depicts a page from the auction platform for an asset that is auctioned, in accordance with an embodiment of the inventive concept.

The Live Auction User Interface 176 runs the live auction. FIG. 7 depicts a page 420 from the auction platform 100 for an asset that is auctioned. Bids are received through the Live Auction User Interface 176. In this example, the asset page 420 shows images 422 of the property on sale, auction status 424, auction period 426, highest bid 428, number of bids 430, number of bidders 432, bid increment 434, and contact information 436.

The logic of running and accessing auction properties is managed by Auction and Property Core Engine System 185. While the live auction is happening, the Auction and Property Core Engine System 185 manages the tasks and state changes in real-time. The Auction and Property Core Engine System 185 also coordinates with Live Auction user Interface 176 to generate notifications regarding highest/winning bid.

The back-end permanent storage system 190 includes an account database 191, a property database 192, and an auction database 193. The account database 191 securely stores all the account information, such as the information received via Account Management User Interface 171. The property database 192 stores information regarding all the properties that may be auctioned, and the auction database 193 stores parameters of an auction, such as starting price, bid increments, start time and end time, etc.

Various agents may run auctions simultaneously. Each agent is managing all the auctions from his brokerage company through a broker section represented to the users by broker auction interface. Hence, a user may look at all the properties from different agents on the auction list user interface, then click on a property of interest to place a bid in the agent's section of the platform 100.

Figure 6:
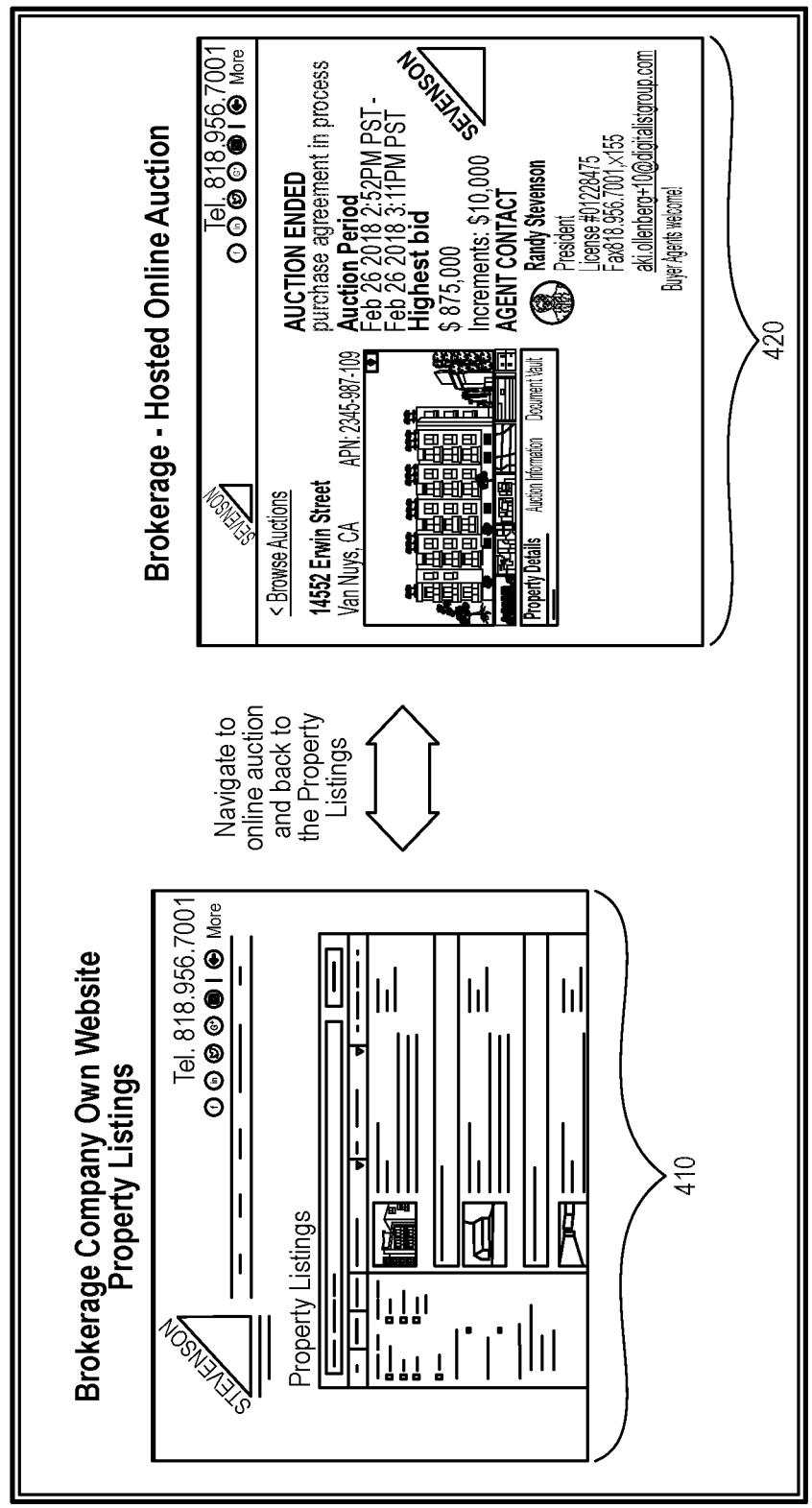
FIG. 6 depicts how the user account in the auction platform can be used as an extension of the user's own application (e.g., a website), in accordance with an embodiment of the inventive concept.

FIG. 6 depicts how, after the broker section is set up at the auction platform 100, it can be used as an extension of the brokerage company's own application (a website in the example shown), in accordance with the inventive concept. In the particular example that is shown, the brokerage company's own application 400 contains a listing 410 of properties offered by the brokerage company, regardless of whether it is part of an auction or not. While a user (e.g., a potential buyer, buyer's agent) is scrolling through the listing 410, she might come across a property that is of interest. If the particular property is being auctioned, there may be a marker indicating that the property is for auction, and a hyperlink. When the user clicks on the hyperlink, she is taken from the agent's application to the auction platform 100.

Figure 3:
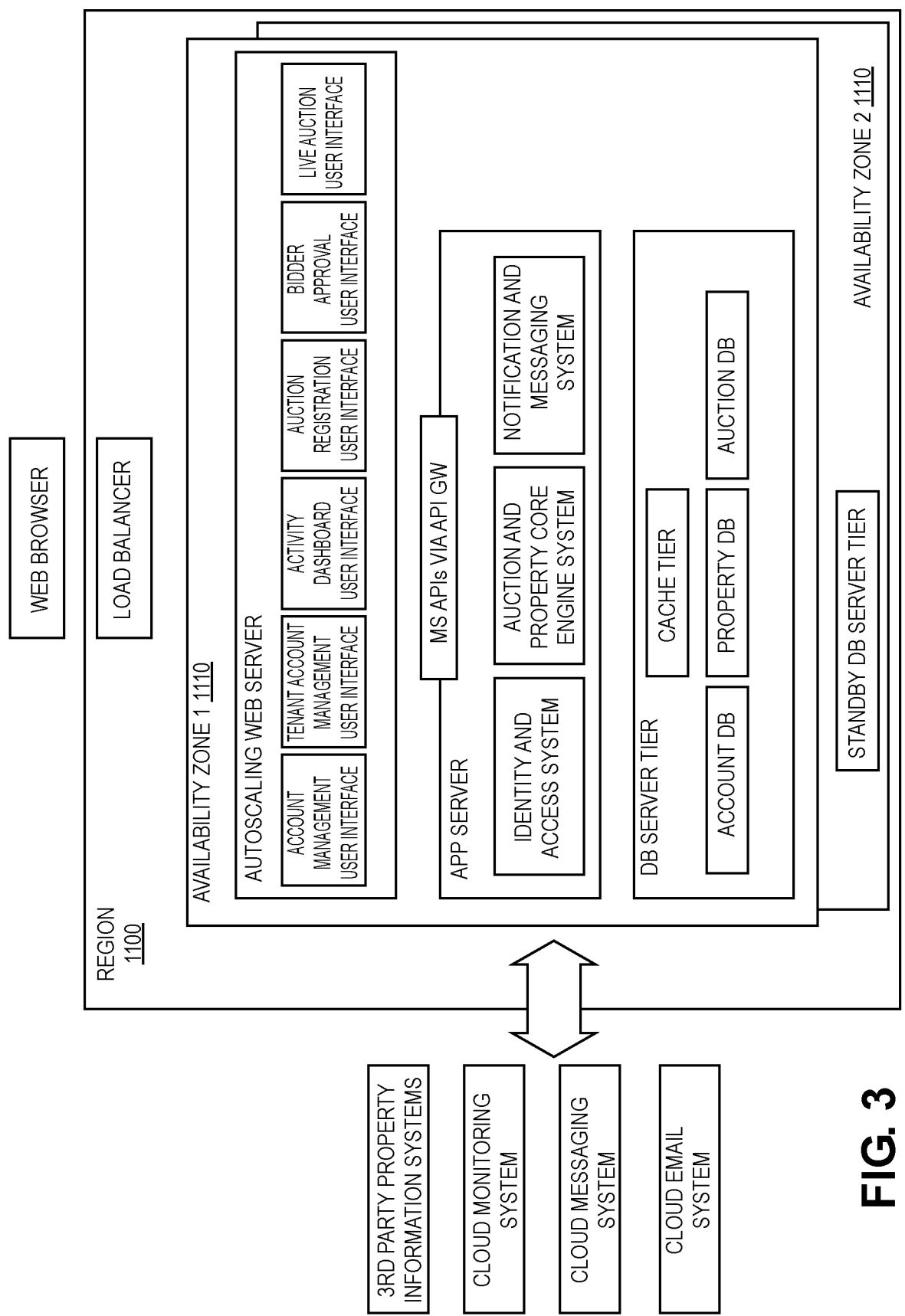
FIG. 3 depicts a scalable version of the online auction system of FIG. 2, in accordance with an embodiment of the inventive concept.

FIG. 3 depicts how the system of FIG. 2 can be scaled up. As shown, there is a Region 1100 and Availability Zones 1110. Each Availability Zone 1110 includes the three tiers depicted in FIG. 2. For example, Region may be United States—West Coast, United States—East Coast, etc. Each Availability Zone may reside in its own server, or each Region may have its own server, depending on data size and implementation preferences. As more information is received, Regions or Availability Zones may be added. As shown, cloud managing systems (e.g., monitoring, messaging, email) and Third Party Property Information Systems may be used in conjunction with the system that is shown.

FIG. 8A and FIG. 8B depict an example of the Activity Dashboard, which provides access to all currently on-going activities of a user. A single user can have multiple roles, e.g. when a user is part of a Broker Account (tenant) but also has activities as a Buyer, Seller, and/or Selling Agent. A user will see a different dashboard interface depending on her role that is approved, e.g. during registration. For example, there may be five different types of dashboard sections, and one or more of them may be displayed to a user:

1. Listing Agent Role Section. If a user is a listing agent, it will appear at the top of the user's dashboard with the broker company name and logo.

2. Buyer Role Section. This section is for a user bidding on properties.

3. Seller Role Section. This section is for any user tagged as "Seller" by a Buyer.

4. Selling Agent Role Section. This is for any user tagged as "Selling Agent" by a Buyer.

5. Watchlist Section. This is a table of auction properties a user can monitor or follow-up without not actively participating. Any user with an account can add a property to his watchlist.

Each row of the dashboard interface is expandable (e.g., one at a time) to view more details. For example, if one wants to know who the Principal Seller is, if there are any other agents/delegates, or agent contact information, such details would be shown in the expanded portion. In addition, a link to the auction page, usernames of applied bidders, a link to an All Bidders page, starting price and reserve price of the auction, end date of the auction, and start and end date of the registration (reflected in countdown) may all be provided in the Dashboard, for example in the expanded portion.

A "listing agent," as used herein, includes not just the listing agent herself but a delegate who is acting on behalf of the listing agent (e.g., an associate or an assistant) as well as an observer who is invited to access the auction platform 100 with approval from the listing agent. Same broad definition applies to "buyer," "seller," and "selling agent."

Select sections may be presented to certain users, depending on registration details provided by the user. For example, if a user is a buyer but not a broker or an agent, the user may not be able to see the listing agent section.

FIG. 8A and FIG. 8B depict an example of a Dashboard 600. As shown in FIG. 8A and FIG. 8B, a Dashboard 600 may be presented in rows according to an embodiment. FIG. 8A depicts a Listing Agent section 620 of a Dashboard, and FIG. 8B depicts a Buyer section 640. These sections are presented to users who are approved to be in the respective roles. One user can play multiple roles even if he has only one account—e.g., an agent can also act as a buyer or seller depending on the case. For a user in the role of listing agent, a dashboard interface such as the one depicted in FIG. 8A shows the number of bidders. She may then click on the bidders to expand that field and find out more details about the qualifications of each of the bidders. For a user in the role of a buyer, a dashboard interface such as the one depicted in FIG. 8B shows her registration status for each property for which she applied to be a buyer. Although the particular example that is depicted shows two lines (one for 555 Castro Street, another or 728 Lola Ln.) per section, this is not a limitation of the inventive concept and there will be as many lines as properties.

The Auction Status is indicted as "Open," meaning the live auction is currently happening. The codes such as "27D," "23H," "49M," "26S" shown in the Status section indicate the number of Days, Hours, Minutes, and Seconds until the next phase of the auction process (e.g., phases such as registration open, auction in progress, bid extender active, auction ended, auction canceled, processing, in escrow, sold). The period until the next phase may be set by the Listing Agent. The starting price and auction period for each property are also shown.

The system described herein enables hosted auctions but not in a traditional marketplace manner where a bidder goes to a site and sees a list of properties for sale that are offered by multiple different brokerage firms. The system of the inventive concept provides a broker-branded auction platform, wherein each broker controls its listing that is viewed through the auction system. The auction page will look different depending who the hosting broker is, as it will be customized by colors, logo, banner, etc. specific to the hosting broker.

Although the auction system is described in the context of real estate auction for simplicity of illustration, the inventive concept may be adapted for other types of auctions.

While the embodiments are described in terms of a method or technique, it should be understood that the disclosure may also cover an article of manufacture that includes a non-transitory computer readable medium on which computer-readable instructions for carrying out embodiments of the method are stored. The computer readable medium may include, for example, semiconductor, magnetic, opto-magnetic, optical, or other forms of computer readable medium for storing computer readable code. Further, the disclosure may also cover apparatuses for practicing embodiments of the inventive concept disclosed herein. Such apparatus may include circuits, dedicated and/or programmable, to carry out operations pertaining to embodiments.

Examples of such apparatus include a general purpose computer and/or a dedicated computing device when appropriately programmed and may include a combination of a computer/computing device and dedicated/programmable hardware circuits (such as electrical, mechanical, and/or optical circuits) adapted for the various operations pertaining to the embodiments.

It should be understood that the inventive concept can be practiced with modification and alteration within the spirit and scope of the disclosure. The description is not intended to be exhaustive or to limit the inventive concept to the precise form disclosed.

What is claimed is:

1. A computer-implemented method of executing an online auction comprising:
   receiving a first property listing from a first agent;
   receiving a second property listing from a second agent;
   presenting, in an auction list user interface, the first property listing and the second property listing, the first property listing including a link that, upon activation, launches a first broker auction interface controlled by the first agent hosting an auction that includes the first property listing; and
   allowing the first agent to run an auction by interfacing with bidders on the first broker auction interface.

2. The computer-implemented method of claim 1 further comprising:
   receiving user registration to identify a registered user; and
   allowing the registered user to access the auction list user interface via redirection from the first broker auction interface.

3. The computer-implemented method of claim 2, further comprising allowing a user to access the auction list user interface from a different application.

4. The computer-implemented method of claim 3, wherein the different application is an advertisement with a link to the auction list user interface.

5. The computer-implemented method of claim 1 further comprising:
   receiving registration information from the first agent, the second agent, and the bidders; and
   storing the registration information in an account database.

6. The computer-implemented method of claim 1 further comprising storing information for the first property listing and information for the second property listing in a property database.

7. The computer-implemented method of claim 1 further comprising running an auction according to predefined parameters in an auction database by interfacing the bidders in the first broker auction interface.

8. The computer-implemented method of claim 1, wherein the first broker auction displays different information depending on a role of the user, the role being one or more of the following:
   a listing agent;
   a buyer;
   a seller; and
   a selling agent.

9. The computer-implemented method of claim 1, wherein the auction list user interface shows one or more of the following information for the first property listing and the second property listing:
   property address;
   user's registration status;
   listing agent;
   number of bids;
   current bid amount;
   auction period; and
   amount of time left until next phase of auction process.

10. The computer-implemented method of claim 1, further comprising allowing a user to create a personalized watchlist section in the auction list user interface by selecting properties to be monitored.

11. The computer-implemented method of claim 10 further comprising storing auction data and property data.

12. A method of executing an online auction comprising:
   showing properties on an online auction interface, the properties including properties that are listed by a first agent and properties that are listed by a second agent, and
   launching a first auction user interface for an auction hosted by the first agent in response to a selection of one of the properties that are listed by the first agent.

13. The method of claim 12, wherein the first auction user interface shows one or more of the following:
   property address;
   user's registration status;
   listing agent;
   number of bids;
   current bid amount;
   auction period; and
   amount of time left until next phase of auction process.

14. The method of claim 12, further comprising launching a second auction user interface for a second auction hosted by the second agent in response to a selection of one of the properties that are listed by the second agent.

15. The method of claim 12, further comprising adjusting information shown in the first auction user interface according to role of the user received during user registration.

16. The method of claim 12, wherein the role of the user is one of the following:
   a listing agent;
   a buyer;
   a seller; and
   a selling agent.

17. The method of claim 12, wherein the first auction user interface is designed by the first agent.

* * * * *